(12) United States Patent
Charkoudian

(10) Patent No.: US 7,073,671 B2
(45) Date of Patent: Jul. 11, 2006

(54) MICROPOROUS MEMBRANE SUBSTRATE HAVING CAUSTIC STABLE, LOW PROTEIN BINDING SURFACE

(75) Inventor: John Charkoudian, Carlisle, MA (US)

(73) Assignee: Millipore Corporation, Billerica, MA (US)

(*) Notice: Subject to any disclaimer, the term of this patent is extended or adjusted under 35 U.S.C. 154(b) by 0 days.

(21) Appl. No.: 10/165,440

(22) Filed: Jun. 7, 2002

(65) Prior Publication Data

US 2003/0226799 A1    Dec. 11, 2003

(51) Int. Cl.
  *B01D 71/06* (2006.01)
  *B01D 21/46* (2006.01)
  *B01D 71/34* (2006.01)
  *B01D 71/42* (2006.01)
  *B01D 71/40* (2006.01)

(52) U.S. Cl. ............ 210/490; 210/500.27; 210/500.35; 210/500.38; 210/500.43; 427/245; 264/48; 264/49; 264/41

(58) Field of Classification Search ................ 210/490, 210/645, 500.35, 500.27, 500.38, 500.43; 427/245; 264/48, 49, 41
See application file for complete search history.

(56) References Cited

U.S. PATENT DOCUMENTS 3,870,639 A * 3/1975 Moore et al. ............... 210/359
4,415,455 A * 11/1983 Osei-Gyimah et al. ..... 210/654
4,618,533 A    10/1986 Steuck ........................ 428/315
4,678,813 A    7/1987 Itoh et al. ...................... 521/61
4,695,592 A    9/1987 Itoh et al. ...................... 421/54
4,906,374 A    3/1990 Gsell ........................... 210/490
4,944,879 A    7/1990 Steuck .................. 210/500.27
4,968,533 A    11/1990 Gsell ........................... 427/245
5,019,260 A    5/1991 Gsell et al. .................. 210/490
5,039,421 A * 8/1991 Linder et al. ............... 210/651
5,217,802 A    6/1993 Scarmoutzos ............ 428/304.4
5,286,382 A    2/1994 Scarmoutzos et al. ...... 210/490
5,929,214 A    7/1999 Peters et al. ................. 530/417
5,993,935 A    11/1999 Rasmussen et al.

FOREIGN PATENT DOCUMENTS

EP    0 272 842    6/1988
EP    0 294 186    12/1988

OTHER PUBLICATIONS

Copy of International Search Report dated Sep. 22, 2003.

* cited by examiner

*Primary Examiner*—Krishnan S. Menon
(74) *Attorney, Agent, or Firm*—Millipore Corporation

(57) ABSTRACT

The present invention provides porous media or membranes having a surface coating that includes a first coating of a cross-linked terpolymer and a second coating comprising a copolymer or a terpolymer modified with a hydrophilic or hydrophobic functional group which has a superior combination of properties, including heat stable biomolecule resistant adsorptive properties, resistance to strong alkaline solutions, and low levels of extractable matter.

20 Claims, No Drawings

MICROPOROUS MEMBRANE SUBSTRATE HAVING CAUSTIC STABLE, LOW PROTEIN BINDING SURFACE

FIELD OF THE INVENTION

The present invention relates to porous media having a bulk matrix of a first material and a surface coating of a second material. The surface coating comprises a first inner polyacrylamide layer and a second outer functional layer which has a superior combination of properties, including heat stability, resistance to strong alkaline solutions, low nonspecific biomolecular binding properties and low levels of extractable matter. In a preferred embodiment, the porous media is a porous membrane.

BACKGROUND OF THE INVENTION

Porous media are useful in many separation and adsorption technologies, such as chromatography. One particular type of porous media, porous membranes, are used for a variety of applications. Porous membranes have a first porous surface, a second porous surface, and a continuous porous structure that extends throughout the membrane from the first to the second surface. The continuous porous structure includes the bulk material matrix and the network of pores. The interface separating the bulk matrix from the pore volume (i.e., the surface of the interior pore network) is known as the interstitial surface.

Porous membranes can be classified as "microporous" membranes or "ultrafiltration" membranes on the basis of the size of the pores of the membrane. Generally, the range of pore sizes for microporous membranes is considered to be from approximately 0.05 micron to approximately 10.0 microns, whereas the range of pore sizes for ultrafiltration membranes is considered to be from approximately 0.002 micron to about 0.05 micron. These pore sizes refer to pore diameter for circular or approximately circular pores, or to a characteristic dimension for non-circular pores.

The pore size of a membrane can be denominated by the size of the smallest species (particle or molecule) that cannot pass through the membrane above a specified fractional passage. A common rating is below 10% passage, which corresponds to a 90% cutoff or retention. Other methods are known to those skilled in the art, including image analysis of scanning electron microscopy to obtain pore size distribution characteristics. Microporous membranes are typically used to remove particulates from liquids and gases. An important application of microporous membranes is in sterile filtration of pharmaceutical solutions to remove any bacteria that may be present in the solution. Microporous membranes are also used as sterile gas vents, which allow gas flow but prevent airborne bacteria from passing through the filter. Ultrafiltration membranes are generally used in applications where retention of smaller species is desired. For example, ultrafiltration membranes are used in the biotechnology industry to concentrate proteins, and in diafiltration applications to remove salts and low molecular weight species from protein solutions. Both ultrafiltration and microporous membranes can be fabricated in several forms, including sheets, tubes, and hollow fibers.

Porous membranes are made from a variety of materials, polymers being the most common. Many commercial membranes are made from engineering plastics, such as polyethersulfone, polysulfone, polyvinylidene fluoride, polyethylene, polytetrafluoroethylene, polypropylene and so forth, to take advantage of their robust thermal, mechanical, and chemical-resistance properties. Unfortunately, these materials are hydrophobic and have a high propensity to adsorb biomolecules.

In general, a hydrophilic membrane which is readily wet with an aqueous solution is preferred for filtration of aqueous solutions. In contrast, with hydrophobic membranes, contact with a low surface tension prewetting liquid followed by water exchange is required to start permeation. This not only introduces added material cost to the process, but any wetting liquid must be exhaustively flushed, which greatly increases the possibility of contamination, process time and cost. A hydrophobic membrane which is not wet with an aqueous solution can be utilized to filter organic solutions or gases.

In addition to permeability and retentive properties, porous membranes have other requirements that are dictated by the nature of the application. For example, they must have sufficient mechanical strength to withstand operating pressures and temperatures. In applications where cleanliness is a major requirement, as in the pharmaceutical or microelectronics wafer-making industry, the amount of material that extracts from the membrane in use must be very small. In applications where the membrane comes in contact with biomolecules, the membrane surface must be resistant to biomolecule adsorption. A biomolecule resistant surface is a surface that adsorbs or binds minimal amounts of biomolecules, such as proteins and nucleic acids; specifically, a surface that adsorbs less than about 30 micrograms of IgG per square centimeter of membrane area as measured by the IgG binding test described herein. It is greatly preferred that a membrane surface be maximally biomolecule resistant, to reduce permeation loss from fouling by surface adsorption or pore blockage, and to prevent product loss by irreversible adsorption or associated biomolecule denaturization.

In many applications, porous membrane come in contact with highly alkaline solutions in cleaning or sanitation operations. Thus, the membrane must have sufficient chemical resistance to withstand such contact without loss of filtration properties, desirable surface properties or mechanical properties.

Porous media and membranes are used with functional surfaces. Functional surfaces have chemical groups or moieties which react with, or adsorb or absorb specific species in the fluid contacting the media or membrane. Examples of such groups are positively or negatively charged groups, affinity ligands such as antibodies or antigens, metal affinity ligands, and hydrophobic interaction groups.

To impart the aforementioned properties to porous media or membranes, manufacturers typically modify the membrane surface (i.e., the first and second surfaces and the interstitial surface) of the bulk matrix material making up the porous media or membrane to make the surface hydrophilic and biomolecule resistant or hydrophobic. This is done by a variety of procedures that coat, attach to, or otherwise cover the surface of the bulk matrix material with a hydrophilic polymer or hydrophilic group or with a hydrophobic polymer or hydrophobic group. While such modification can solve some problems related to the hydrophobic or high biomolecule binding of the bulk matrix material surface, it also can add other problems. For example, such modifications increase the amount of material able to be extracted from the membrane during use, and the modification material can have low tolerance to exposure to alkaline solutions. In addition, in many applications membranes are heated, either by wet heat as in autoclaving or steam sanitization, or by dry heat, as in a drying step. It has been observed that such heating will reduce hydrophilicity and decrease biomolecule resistance of some modified surfaces to the extent that they cannot be used for their intended purpose.

Some membranes of the prior art are made by modifying the surface of preformed porous membranes with cross-linked hydroxyacrylates, where the crosslinking monomer is a difunctional acrylate ("Case A membranes"). Such membranes have excellent resistance to biomolecule adsorption, excellent heat stability of the biomolecule resistance, and acceptable flow loss (i.e., the reduction in flow or permeability compared to the unmodified membrane). However, while these membranes have acceptable cleanability characteristics (i.e., the ability to clean the membrane by washing such that residual extractable matter ("extractables") is lowered to an acceptable level, it was found that to lower extractables to below a certain level, about 2 microgram per square centimeter using the TOC test (described herein in the "Methods" section), a very extensive extraction regime was needed. In addition, these membranes were sensitive to strong alkaline solutions in that they lost their initial permeation characteristics and low extractables characteristics.

Much of the prior art describes the use of hydroxyl containing monomers, usually carbonyl ester containing acrylate polymers, to produce membrane surface modifications having hydrophilic character and high resistance to protein binding. However, it is known that polymers from such monomers are not resistant to strong alkaline solutions. For example, a solution of 1.0 normal sodium hydroxide will hydrolyze the carbonyl containing acrylate polymers to acrylic acid containing polymers. Such acrylic acid containing polymers are ionically charged under certain pH conditions, and will attract and bind oppositely charged proteins or biomolecules, thus increasing sorption and membrane fouling. In addition, acrylic acid containing polymers swell in water to an extent that they constrict pore passages, thus reducing membrane permeability and productivity. Moreover, polymers from hydroxyl containing monomers, such as hydroxy acrylates, further react in strong alkaline solutions and degrade into soluble low molecular weight fragments, which dissolve away and expose the underlying substrate porous media or membrane.

Various methods of modifying porous membranes are known in the art. For example, U.S. Pat. No. 4,618,533 discloses and claims a composite porous thermoplastic membrane which comprises a porous membrane substrate having an average pore size between about 0.001 and 10 microns formed of a first polymer, the substrate being directly coated on its entire surface with a cross-linked second polymer formed from a monomer polymerized in situ with a free radical initiator on the substrate, where the composite porous membrane has essentially the same porous configuration as the membrane substrate.

U.S. Pat. No. 4,944,879 discloses a composite porous membrane having desired bulk properties on which is coated a cross-linked polymer having desired surface priorities. The cross-linked surface polymer is produced from a crosslinkable monomer or polymer by energy from an electron beam in the absence of a chemical polymerization initiator.

Similar modified porous media are disclosed in U.S. Pat. Nos. 4,906,374, 4,968,533, and 5,019,260, in which hydroxyl containing polymeric material is derived from monomers having hydroxyl groups and moieties characterized by having one polymenzable unit of unsaturation, such as hydroxy or hydroxy-forming substituted acrylates or methacrylate esters. Polymers from such monomers are known to lack resistance to degradation by strong alkaline solutions.

Chapman et al (J. Am. Chem. Soc. 2000, 122, 8303–8304) describe the use of self assembled monolayers (SAM) to screen functional groups for protein resistance. They report several functional groups to be protein resistant, including N-substituted amide functionalities.

U.S. Pat. Nos. 4,695,592 and 4,678,813 describe a process and product for a hydrophilized porous polyolefin membrane with a crosslinked polymer, which is composed of 50% or more of diacetone acrylamide monomer.

Iwata et al (J. Membrane Sci. 1991 55 119–130) report acrylamide coatings of membranes that have temperature responsive properties (TRP), specifically polyacrylamides, and particularly poly(N-isopropylacrylamide (polylPAA)). Iwata report the graft polymerization of homopolymers of polylPAA and copolymers with acrylamide to a first surface of a PVDF membrane. However, they do not cross-link the polymers, as that would impede the polymer TRP.

U.S. Pat. No. 5,929,214 to Peters et al, describes porous monoliths functionalized and/or grafted with TRP polymers, including non-crosslinked copolymers of polylPAA. These membranes are designed to adsorb biomolecules, and the Peters et al. patent does not teach the production of protein or biomolecule resistant surfaces.

U.S. Pat. Nos. 5,217,802 and 5,286,382 describe methods for rendering the surface of polymeric membranes hydrophobic.

It can be seen that practitioners attempting to develop optimized membranes for sterile filtration and other applications in the pharmaceutical and biotechnology industries must overcome significant problems. Facing stringent cost, performance and safety requirements, a practitioner must use materials and develop manufacturing methods that produce membranes with not only optimized flow and retention characteristics, but be economical to produce, meet cleanliness criteria, be stable to the various chemical environments which are commonly encountered, and be very resistant to biomolecule adsorption. Thus, it would be desirable to have a membrane modification that results in a hydrophilic, biomolecule resistant surface that is heat stable, which is resistant to degradation by alkaline solutions, and which has very low levels of material capable of being extracted therefrom. It would also be desirable to provide membranes having highly hydrophobic surfaces for use, for example, in filtering gases.

SUMMARY OF THE INVENTION

This invention is directed to polymeric porous media, preferably porous membranes, which have been modified by forming in situ on the surface thereof a cross-linked polymeric terpolymer first coating followed by a second coating comprising a crosslinked copolymer or terpolymer modified with functional groups, or a non-polymeric surface modification to the first coating which is covalently bound to the first coating. In a preferred embodiment, the coated porous media or membranes have substantially the same porous character as the unmodified porous media or membrane, and also have specific functional surface properties, and where the first coating has heat resistant biomolecule resistance, chemical resistance to strong alkaline solutions, and very low levels of extractable matter. The membrane with two coatings has heat stable functionality. The modified porous media or membrane does not substantially change pore size as a function of temperature.

Thus, the present invention provides porous membranes comprising a porous substrate and a separately formed, caustic resistant, heat stable biomolecule resistant surface first coating and a heat stable functional second coating.

Preferably, the porous substrate is a membrane, more preferably a microporous membrane.

In a further preferred embodiment, the invention provides a microporous membrane substrate which is preferably formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride, and a heat stable biomolecule resistant first coating that is a separately formed surface coating which comprises a crosslinked terpolymer as a first coating, said terpolymer comprising at least two monofunctional monomers selected from the group consisting of acrylamides, methacrylamides, and N-vinyl pyrrolidones, and at least one polyfunctional monomer selected from the group consisting of polyfunctional acrylamides, polyfunctional methacrylamides, and diacroylpiperazines. The first coating is subsequently coated with a second coating comprising a polymeric coating, or a non-polymeric surface modification to the first coating which is covalently bound to the first coating. The polymeric coating can be a copolymer or terpolymer formed from at least one polyfunctional monomer modified with at least one hydrophilic or hydrophobic functional group, said hydrophilic monomers selected from the group consisting of polyfunctional acrylamides, polyfunctional methacrylamides and diacroylpiperazines. Suitable functional groups include quaternary ammonium salts, amino, epoxy, hydroxyl, acyolyl halide, carbodiimide, urethane, ester, aldehyde or the like. Suitable polymerizable and crosslinkable hydrophobic monomers include fluoroacrylates such as 2-(N-ethylperfluorooctanesulfonamido)ethyl acrylate, 2-(N-ethylperfluorooctanesulfonamido)ethyl methacrylate or homologs thereof; 3,3,4,4,5,5,6,6,7,7,8,8,9,9,10,10, 10-heptadecafluorodecyl acrylate, 3,3,4,4,5,5,6,6,7,7,8,8,9, 9,10,10,10-heptadecafluorodecyl methacrylate or homologs thereof; fluoroalkylsiloxanes such as tridecafluoro-1,1,2,2-tetrahydrooctyl-1-triethoxysilane or homologs thereof; fluorinated styrenes such as pentafluorstyrene, trifluoromethylstyrene or homologs thereof; fluoroolefins such as perfluorobutylethylene or homologs thereof.

In forming a hydrophobic surface, a reagent bath of the second coating comprised of: (1) a polymerizable monomer which is ethylenically unsaturated and has at least one fluoroalkyl group (2) a polymerization initiator, if needed, and (3) a cross-linking agent in a solvent for these three constituents, is contacted with the porous membrane substrate under conditions to effect polymerization of the monomer and deposition of the resulting cross-linked polymer onto the porous membrane substrate. When the monomer is difunctional or has higher functionality, an additional cross-linking agent need not be utilized.

It has been found that when the first coating and second coating are formed separately rather than being admixed together, that the resultant surface-modified porous substrate is characterized by superior heat resistance of the functional surface and resistance to biomolecule absorption or by superior heat resistance and hydrophobicity.

In a further preferred embodiment, the invention provides clean, caustic resistant, porous membranes comprising a polyvinylidene difluoride microporous membrane substrate and a heat stable biomolecule resistant surface, wherein said heat stable biomolecule resistant surface is a separately formed surface coating which comprises a first coating and a second coating wherein the first coating is a crosslinked terpolymer, said crosslinked terpolymer being a copolymer formed from either:
  (a) methylene-bis-acrylamide, dimethylacrylamide, and diacetone acrylamide; or
  (b) methylene-bis-acrylamide, vinylpyrrolidone, and either of dimethylacrylamide or diacetone acrylamide, and the second crosslinked coating is formed of at least one monofunctional monomer and a polyfunctional crosslinking agent, each monomer being modified with at least one hydrophilic functional group and wherein the monofunctional monomers can be:
    (a) 3-acrylamidopropyl) trimethylammonium chloride or
    (b) 3-acrylamidoglycolic acid or
    (c) 3-acrylamidopropyl sulfonic acid
    (d) N-hydroxymethacrylamide Also provided in accordance with some preferred embodiments of the present invention are methods for the preparation of a clean, caustic resistant porous membrane, said membrane comprising a porous membrane substrate and a heat stable biomolecule resistant surface coating, said method forming a first coating by comprising the steps of:
  a. providing a porous membrane substrate;
  b. optionally washing said porous membrane substrate with a wetting liquid to wet the surfaces thereof;
  c. optionally washing said wet porous membrane substrate with a second wetting liquid to replace said first wetting liquid, leaving said porous membrane substrate wetted with said second liquid;
  d. contacting the surface of said porous membrane substrate with a reactant solution containing:
    (1) at least two monofunctional monomers selected from the group consisting of acrylamides, methacrylamides, and N-vinyl pyrrolidones; and (2) at least one polyfunctional monomer selected from the group consisting of polyfunctional acrylamides, polyfunctional methacrylamides and diacroylpiperazines; said solution optionally further comprising one or more polymerization initiators;
  e. removing the membrane substrate from the solution,
  f. polymerizing said monomers to form said heat stable biomolecule resistant surface; and
  g. washing said membrane to form the first coating on the porous substrate,
  h. contacting the membrane from step (g) with an aqueous solution of the, at least one, monofunctional monomers having hydrophilic functional groups, a polyfunctional cross-linking agent and a photo initiator;
  i. removing the porous membranes in step (h) from the aqueous solution;
  j. exposing the membrane from step (i) to ultraviolet light
  k. washing the membrane and
  l. drying the membrane.

Also, in accordance with this invention, there is provided a method for making a membrane having a hydrophobic surface comprising the steps of: conducting the steps a through g set forth above to form the first coating.
  h. contacting the membrane from step (g) with a non-aqueous solution of at least one monofunctional monomer having at least one fluoroalkyl group, a polyfunctional cross-linking agent and a photo polymerization initiator.
  i. removing the porous membrane from the organic solution.
  j. exposing the membrane from step (i) to ultraviolet light.
  k. washing the membrane in a nonaqueous solvent and l. drying the membrane.

Preferably, the sizes of the pores of the porous substrate prior to performing steps (a) through (e) are not significantly different from the sizes of said pores after performing steps (a) through (l). In some preferred embodiments, the porous membrane substrate is a microporous membrane.

Representative suitable porous substrates such as microporous membranes include substrates formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride, with polyvinylidene difluoride being more preferred.

In a preferred embodiment of the methods and membranes of the invention, the crosslinked terpolymer forming the first coating comprises at least one monofunctional monomer that is an acrylamide, wherein the acrylamide nitrogen of said acrylamide is substituted with at least one gem dialkyl substituted carbon and the crosslinked polymer of the second coating comprises any mixture of monomers which, when polymerized on the first coating, provides the molecular surface needed to carry out the desired membrane application.

In a particularly preferred embodiments of the methods and membranes of the invention, the crosslinked terpolymer forming the first coating is a copolymer formed from dimethylacrylamide, diacetone acrylamide, and methylene-bis-acrylamide. In other particularly preferred embodiments, the crosslinked terpolymer is a copolymer formed from methylene-bis-acrylamide, vinyl pyrrolidone, and either of dimethylacrylamide or diacetone acrylamide and the crosslinked polymer of the second coating comprises any mixture of monomers which, when polymerized on the first coating, provides the molecular surface needed to carry out the desired membrane application.

In a further preferred embodiment of the membranes of the invention, the heat stable biomolecule resistant surface of the membranes forming the first coating is a separately formed surface coating comprising a crosslinked terpolymer; the crosslinked terpolymer comprising:

at least one polyfunctional monomer selected from the group consisting of polyfunctional acrylamide monomers, polyfunctional methacrylamide monomers, and diacroylpiperazines; and at least two different monofunctional monomers selected from the group of N-vinyl pyrrolidone monomers and monomers having the general formula: $H_2C=C(R^1)C(=O)N(R^2)(R^3)$ wherein:

$R^1$ is —H or $CH_3$, $R^2$ is H or $C_1$–$C_6$, preferably $C_1$–$C_3$ alkyl, either linear or branched, $R^3$ is H or $C_1$–$C_6$, preferably $C_1$–$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$–$C_5$ alkyl, either linear or branched, or $(CH_2$—$CH_2$—O)n-$R^5$, where $R^5$ is —H or —$CH_3$, and n=2 or 3; provided that $R^2$ and $R^3$ are not simultaneously H.

In one aspect of the methods and membranes of the invention, the crosslinked terpolymer of the first coating of the membranes of the invention further comprises a supplemental property modifying monomer, which is preferably present in an amount that is less than either of the monofunctional monomers.

Suitable supplemental property modifying monomers are selected from the group consisting of positively or negatively charged ion containing monomers, monomers with affinity groups, or monomers with significant hydrophobic character. In further embodiments, the supplemental property modifying monomer is selected from the group consisting of (3-(methylacryloylamino)propyl)trimethyl-ammonium chloride, (3-acrylamidopropyl)trimethylammonium chloride, 2-acrylamido-2-methyl-1-propanesulfonic acid and aminopropylmethacrylamide.

Typically, two of the monofunctional monomers of the terpolymer are present in the weight ratio of about 1% to 5%, based on weight about 1% to 2% based on weight being more preferred.

The total amount of monofunctional monomers present to form the first coating is from about 0.5% to about 20%, based on weight with from about 2% to about 10% based on weight being more preferred, and from about 4% to about 8% being even more preferred.

The ratio of the total amount of monofunctional comonomers to polyfunctional crosslinker monomer is about 10 to about 1 with about 6 to about 2 being more preferred.

In embodiments, the second coating can be a terpolymer as described above, with one or more monomers containing a functional group.

In embodiments, the second coating can be a crosslinked polymer containing a functional group.

In embodiments, the second coating can be a non-polymeric surface modification of the first coating, which covalently attaches a functional group to the first coating, either directly, or by means of a linker arm. A linker arm is a chain of molecules, one end of which is covalently attached to the first coating, and the other end covalently holding the functional group or groups.

The membranes of the invention have a biomolecule binding of less than about 30 microgram per square centimeter, preferably less than about 20 per square centimeter measured by the IgG binding test.

The membranes of the invention have TOC extractables of less than about 2.0 micrograms of extractable matter per square centimeter of membrane as measured by the NVR Extractables test. More preferably, the membranes of the invention have less than about 1.5, more preferably less than about 1.0 micrograms of extractable matter per square centimeter of membrane as measured by the NVR Extractables test.

The membranes of the invention have caustic resistance of less than about 1.5, preferably less than about 1.0 as measured by the Flow Time Measurement test.

The present invention also provides methods for removing cells from a solution comprising the steps of providing a solution comprising having undesired cells; and filtering said solution through a membrane of the invention.

The present invention also provides methods for sterilizing a solution comprising the steps of providing a non-sterile solution and filtering said solution through a membrane of the invention.

DETAILED DESCRIPTION

The present invention provides porous membranes with functional surfaces which have a superior combination of desirable properties, including resistance to non-specific biomolecule adsorption (sometimes referred to as "low affinity or sorbability for biomolecules" or "biomolecule resistance"), resistance to loss of functionality due to heat or drying, and heat stability to non-specific biomolecule adsorption. In accordance with the present invention, it has been discovered that polymeric porous media, preferably porous membranes useful for filtration or as a diagnostic media, can be modified by forming in situ a first coating comprising a cross-linked mixed acrylamide terpolymer (MAM) and in a subsequent step, a modification of the first coating comprising a second polymeric coating or the attachment of functional groups on the MAM surface to obtain a coated membrane having the aforementioned properties.

In many uses for microporous membranes and media, it is desirable for the media or membrane to have a functional surface. Functional surfaces are surfaces are surfaces that have specific chemical moieties which can react with, absorb or adsorb molecules in the fluid permeating or contacting the membrane or media. One drawback to the use of functionalized microporous membranes is that the functionality can be lost as a result of exposure to increased temperature or drying. While a heat stable hydrophilic, low biomolecule binding surface can be formed on a microporous membrane through the use of a mixed acrylamide monomerterpolymer (MAM), it has been surprisingly found that the MAM surface can serve as a substrate upon which functional modifications can be formed which are heat stable. If these modifications were formed on the bare membrane or media, they would not be heat stable.

Furthermore, the MAM substrate of the first coating is low biomolecule binding. In many cases, the user of the present invention will want to use the functionality provided by the modification to the MAM surface to bind to a specific protein or other biomolecule. Having a low biomolecule binding surface as a substrate will enhance the specificity of the specific functional binding of the modified surface by preventing non-specific binding on the substrate membrane.

As used herein, the term "biomolecule" is intended to mean any organic molecule that is part of a living organism, or analogs thereof. Thus, biomolecules include polymers of amino acids, for example peptides and proteins (including antibodies and enzymes), and polymers of nucleotides such as DNA or RNA molecules, and DNA and RNA probes. Also included within the definition of biomolecules are carbohydrates and lipids. It is intended that synthetically produced analogs of each of the foregoing be included in the definition of the term "biomolecule".

As used herein, the terms "non-specific biomolecule resistant" or "non-specific biomolecule resistance" as applied to membranes or membrane surfaces of the invention mean a membrane or membrane surface that adsorbs less than about 50 micrograms, preferably less than about 30 micrograms of IgG per square centimeter of membrane as measured by the IGG binding test described herein.

Non-specific refers to any biomolecule that the porous membrane is not specifically modified to react with or absorb. Modifications could be directed to react with or absorb specific biomolecules as, for example, affinity ligands such as antibodies, antigens, lipids, DNA, plasmids, glycosylated molecules, metal affinity groups or hydrophobic interaction groups.

As used herein in connection with the membranes of the present invention, the term "heat stable" as applied to the term "non-specific biomolecule resistant surface" means a non-specific biomolecule resistant surface, for example a membrane surface, that, after exposure to heat as described herein, has less than about twice the IgG adsorption of the same surface prior to heat exposure, as measured by the IgG test described herein.

Heat stable functional surfaces means surfaces which retain substantially all their functionality after heat exposure as described herein.

The invention also provides clean, caustic resistant porous membranes comprising a porous substrate and a separately formed heat stable biomolecule resistant surface. Preferably, the porous substrate is a membrane, more preferably a microporous membrane.

As used herein in connection with the membranes and methods of the present invention, the term "clean membrane" means a membrane that, when produced, has either:
a. less than about 2 micrograms of extractable matter per square centimeter of membrane, and preferably less than about 1 microgram of extractable matter per square centimeter, as determined by the NVR Extraction test described herein; or
b. less than about 1 microgram of extractable matter per square centimeter of membrane as determined by the TOC extractables test described herein.

As used herein, the term "caustic resistant" as applied to membranes of the invention means a membrane that remains wettable after exposure to 0.1 NaOH for two hours at ambient temperature, and has a ratio of flow times after such exposure to that before such exposure of less than about 1.5, when measured by the flow time measurement test described herein.

A wide variety of porous media are useful in the practice of the present invention. Examples of such porous media include ceramics, metals, carbon and polymers. In a preferred embodiment, the porous medium is a polymer membrane. Representative polymers that can be used to manufacture porous membranes useful in the present invention include polysulfone polymers, preferably aromatic sulfone polymers, such as polysulfone and polyethersulfone polymers, perfluorinated thermoplastic polymers including polytetrafluoroethylene and polyvinylidene difluoride, polyolefin polymers such as polyethylene, ultrahigh molecular weight polyethylene and polypropylene, and polyesters such as polyethyleneterepthalate and polycarbonate. In a particularly preferred embodiment, the porous membrane is a polyvinylidene difluoride membrane. Those skilled in the art will readily be able to identify other polymers useful in the formation of porous membranes suitable for the present invention.

The porous media or membrane can be a hydrophobic media or a hydrophobic membrane. In other preferred embodiments, the porous media or membrane is hydrophilic media or a hydrophilic membrane. In embodiments where the porous membrane is hydrophilic, polyamides, cellulose acetate and cellulose are preferred.

In some preferred embodiments, the heat stable biomolecule resistant surface is formed on a porous membrane. As used herein, the term "porous membrane" includes both microporous membranes and ultrafiltration membranes. The ultrafiltration and microporous membranes of the invention can be in any of several forms, including sheets, tubes, and hollow fibers.

As used herein, the term "surface" as applied to the surface coatings of the membranes and methods of the invention shall mean the entire surface area of a porous media or membrane, including external surfaces and the internal surface of the porous media or membrane. The term "external surface" means a surface that is exposed to view, for example either of the planar porous surfaces of sheet membranes. The term "internal surface" is intended to denote the internal surface of a porous network, i.e., the interstitial area, of a porous media or membrane.

In general, porous membranes can be skinned or unskinned. A skin is a relatively thin, dense surface layer integral with the substructure of the membrane. In skinned membranes, the major portion of resistance to flow through the membrane resides in the thin skin. In both microporous and ultrafiltration membranes, the surface skin, where present, contains pores leading from the external surface to the continuous porous structure of the membrane below the skin. For skinned microporous and ultrafiltration membranes, the pores represent a minor fraction of the external surface area. In contrast, an unskinned membrane will be porous over the major portion of the external surface. The external surface porosity of the membrane (that is, the arrangement of pores of the external surface of the membrane as viewed by, for example, scanning electron microscopy; "SEM") can be single pores that are relatively evenly distributed on the external surface of the membrane, or can be discrete areas of porosity, or mixtures thereof. As used herein, the term "surface porosity" as applied to an external surface of a membrane is the ratio of the area defined by the pore openings of the external surface to the total surface area of the external surface.

Microporous membranes useful in the practice of the present invention are classified as symmetric or asymmetric, referring to the uniformity of the pore sizes across the thickness of the membrane, or, for a hollow fiber, across the porous wall of the fiber. As used herein, the term "symmetric membrane" means a membrane that has substantially uniform pore size across the membrane cross-section. The term "asymmetric membrane" means a membrane in which the average pore size is not constant across the membrane cross-section. For example, in asymmetric membranes pore sizes can vary smoothly or discontinuously as a function of location through the membrane cross-section. As will be appreciated, included within the definition of "asymmetric membranes" are membranes that have a ratio of pore sizes on one external surface to those on the opposite external surface that are substantially greater than one.

As used herein, the term "crosslinked terpolymer" means a polymer made from three or more monomers, of which at least one monomer has two or more reactive sites which can take part in a polymerization reaction, or can crosslink separate polymer chains. Terpolymers are generally considered as being made from three monomers, but in the context of the present invention, terpolymers are not limited to three monomers, as it may be desirable to use one or more additional monomers to impart or refine desired properties of the membrane. In some preferred embodiments, the crosslinked terpolymer is made from two monofunctional monomers and one difunctional monomer.

The crosslinked terpolymer comprising the first coating preferably covers the entire surface of the porous media or membrane. The crosslinked terpolymer is formed in situ from a solution of two or more monofunctional monomers and a crosslinking polyfunctional monomer (referred to herein as the "reactant solution"). A monofunctional monomer is one that has a single unsaturated functional group. Polyfunctional monomers are molecules which have more than one unsaturated functional group. Preferably, two or more of the monofunctional monomers are mono- or di-N-substituted acrylamides or methacrylamides. The crosslinking monomer is preferably a polyfunctional acrylamide or methacrylamide. In one particularly preferred embodiment, dimethylacrylamide and diacetone acrylamide are used with methylene-bis-acrylamide. In another particularly preferred embodiment, N-vinyl pyrrolidone is substituted for one of the mono- ordi-N-substituted acrylamide or methacrylamide monofunctional monomers.

In a preferred embodiment, at least one polyfunctional monomer is a polyfunctional acrylamide monomer, a polyfunctional methacrylamide monomer, or a diacroylpiperazine, and at least two different monofunctional monomers are selected from acrylamide monomers, methacrylamide monomers, and N-vinyl-pyrrolidones.

In a preferred embodiment of the first coating comprises at least one polyfunctional monomer is a polyfunctional acrylamide monomer, a polyfunctional methacrylamide monomer, or a diacroylpiperazine, and at least two different monofunctional monomers are selected from N-vinyl pyrrolidone monomers and monomers having the general formula:

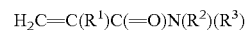

wherein:
$R^1$ is —H or $CH_3$,
$R^2$ is H or $C_1$–$C_6$, preferably $C_1$–$C_3$ alkyl, either linear or branched,
$R^3$ is H or $C_1$–$C_6$, preferably $C_1$–$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$–$C_5$ alkyl, either linear or branched, or $(CH_2$—$CH_2$—O$)n$-$R^5$, where $R^5$ is —H or —$CH_3$, and n=2 or 3; provided that $R^2$ and $R^3$ are not simultaneously H.

In some more preferred embodiments, the crosslinked terpolymer is a polymer formed from either:
(a) methylene-bis-acrylamide, dimethylacrylamide, and diacetone acrylamide; or
(b) methylene-bis-acrylamide, -vinyl pyrrolidone, and either of dimethylacrylamide or diacetone acrylamide.

The second coating can be a terpolymer as described above, with one or more monomers containing a functional group. The second coating can be a crosslinked polymer containing a functional group. Furthermore, the second coating can be a non-polymeric surface modification of the first coating, which covalently attaches a functional group to the first coating, either directly, or by means of a linker arm. A linker arm is a chain of molecules, one end of which is covalently attached to the first coating, and the other end covalently holding the functional group or groups.

Also provided in accordance with a preferred embodiment of the present invention are methods for the preparation of a clean, caustic resistant porous membrane, said membrane comprising a porous membrane substrate and a heat stable biomolecule resistant surface coating, said method comprising the steps of:
  a. providing a porous membrane substrate;
  b. optionally washing said porous membrane substrate with a wetting liquid to wet the surfaces thereof;
  c. optionally washing said wet porous membrane substrate with a second wetting liquid to replace said first wetting liquid, leaving said porous membrane substrate wetted with said second liquid;
  d. contacting the surface of said porous membrane substrate with a solution containing:
    (1) at least two monofunctional monomers selected from the group consisting of acrylamides, methacrylamides, and N-vinyl pyrrolidones; and
    (2) at least one polyfunctional monomer selected from the group consisting of polyfunctional acrylamides, polyfunctional methacrylamides and diacroyl piperazines;
    said solution optionally further comprising one or more polymerization initiators;
  e. removing the membrane substrate from the solution,
  f. polymerizing said monomers to form said heat stable biomolecule resistant surface; and g. washing said membrane to form the first coating on the porous substrate,
h. contacting the membrane from step (f) with an aqueous solution of the, at least one, monofunctional monomers having hydrophilic functional groups, a polyfunctional cross-linking agent and a photo initiator;
i. removing the porous membranes in step (g) from the aqueous solution;
j. exposing the membrane from step (i) to ultraviolet light
k. washing the membrane and
l. drying the membrane.

In preferred embodiments, the entire surface of the porous media or membrane is coated with the two coatings. The method of coating when polymeric coatings are used is similar for the first and second coating. The monomers will be different, or in different proportions. Those skilled in the art will be able to modify the description to the requirements for each coating. Whereas the first coating has to be a terpolymer as described, the second coating can also be a crosslinked polymer having the desired functional properties. Thus, the reactant solutions should preferably wet the entire surface of the porous media or membrane. This is preferably facilitated for the first coating by performing a washing step prior to contacting the porous media or membrane with the reactant solution. Thus, in some preferred embodiments for forming the first coating, the porous media or membrane is first washed with a washing liquid which completely wets the entire porous media or membrane surface. Preferably, the washing liquid does not swell or dissolve the porous media or membrane, and also can preferably be exchanged with the reactant solution. No preliminary washing steps are required to form the second coating.

When an aqueous reactant solution is employed, for forming the first coating, the wetting liquid can be an organic-water composition having lower surface tension than the surface tension required to wet the porous media or membrane. Examples of suitable wetting liquids are alcohol-water solutions, preferably methanol-water, ethanol-water, or isopropanol-water solutions.

Where a washing step is employed to form the first coating, it is desirable to perform a second washing step. For example, where one or more components of the wetting liquid can interfere with the polymerization or crosslinking reactions, a second washing step can be used to remove the washing liquid and replace the same with a second washing liquid that does not interfere with the polymerization or crosslinking reactions. For example, if an aqueous reactant solution is to be used, the wet porous media or substrate is washed with water to remove the first wetting liquid and produce a water filled porous media or membrane. The wet porous media or membrane is then contacted with the reactant solution (for example by soaking in the reactant solution) to produce the desired reactant composition in the pores of the porous media or membrane, and on the external surfaces thereof. Preferably, the first and second washing steps, where desired, are performed at ambient temperatures, for instance, 20° C. to 30° C., and preferably for times from a few seconds to a few minutes.

If the reactant solution for forming the first coating wets the porous media or membrane sufficiently, due to containing an organic solvent for that purpose, or if the concentration of reactants in the reactant solution is sufficient to lower the surface tension of the solution to allow the reactant solution to fully wet the porous media or membrane, then neither of the washing steps are required. Thus, the reactant solution can contain one or more additives which lower the surface tension of the reactant solution sufficiently to avoid such washing steps, and which do not interfere with the subsequent polymerization reaction. Preferred examples of such additives include ethyl hexyl diol, propylene carbonate, tripropyleneglycol methyl ether and 2-methyl-2,4-pentane diol. The amount of additive to the reactant solution required to achieve proper wetting depends on the amount and type of monomers and initiators being used, and will be readily determinable by those of skill in the art without undue experimentation.

The reactant solution for the first coating includes solvent, monofunctional monomers, at least one polyfunctional crosslinking monomer, and, optionally, one or more initiators. The choice of solvent for the reactant solution depends on the choice of monomers and optional initiators. The solvent preferably (1) dissolves the reactants and, if present, the initiator; (2) does not interfere or hinder the polymerization reaction; and (3) does not attack the porous media or membrane. One example of a particularly preferred solvent is water.

In some especially preferred embodiments of the invention, the terpolymer is formed from at least two monofunctional monomers chosen from acrylamides, methacrylamides, or N-vinyl pyrrolidones, and at least one polyfunctional acrylamide or methacrylamide crosslinking monomer. However, in other preferred embodiments, other monomers may be used. These include N-vinyl pyrrolidones, and other mono- or di-N-substituted acrylamide or methacrylamide monomers, for example those having the formula:

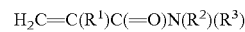

wherein:

$R^1$ is —H or $CH_3$, $R^2$ is H or $C_1$–$C_6$, preferably $C_1$–$C_3$ alkyl, either linear or branched, $R^3$ is H or $C_1$–$C_6$, preferably $C_1$–$C_3$ alkyl, either linear or branched, or $C(CH_2)_2CH_2C(=O)CH_3$, or $(P=O)((NCH_3)_2)_2$, or $C=ON(CH_3)_2$, or $CH_2$—O—$R^4$, where $R^4$ is $C_1$–$C_5$ alkyl, either linear or branched, or $(CH_2$—$CH_2$—O)n-$R^5$, where $R^5$ is —H or —$CH_3$, and n=2 or 3; provided that $R^2$ and $R^3$ are not simultaneously H.

It is preferred that the ratio of a first monofunctional comonomer to a second monofunctional comonomer be from about 1 to 5, more preferably from about 1 to 2. In further preferred embodiments, the total amount of comonomers is from about 0.5% to about 20%, more preferably between about 2% to about 10%, and still more preferably from about 45 to about 8%.

The terpolymer can contain one or more monofunctional monomers in addition to the two monofunctional monomers previously described. Such additional monofunctional monomers can be advantageously employed to impart or modify specific properties of the terpolymer. For example, in some embodiments where it is desirable to modify the hydrophilic nature or ionic charge content of the terpolymer, it is preferable to include a third monofunctional monomer having a different functionality from the other two monofunctional monomers to effect the modification. Preferably, where an additional monofunctional monomer or monomers are employed in the terpolymer, such additional monomers are employed in a minor amount, or an amount comparable to the monofunctional monomers. Representative additional property modifying monomers include can be(3-(methacryloylamino)propyl)-trimethylammonium chloride, (3-acrylamidopropyl)trimethylammonium chloride, 2-acrylamido-2-methyl-1-propanesulfonic acid and aminopropylmethacrylamide.

In preferred embodiments if the invention, the terpolymer contains at least one polyfunctional crosslinker monomer (or "crosslinking monomer"). While not wishing to be bound by a particular theory, it is believed that the crosslinking monomer facilitates a permanent modification to the porous substrate or membrane by, inter alia, both participating in the chain polymerization reactions, and by crosslinking the polymerized chains of monofunctional monomer. Examples of preferred crosslinking monomers suitable for use in the present invention include polyfunctional acrylamides, polyfunctional methacrylamides, and diacroylpiperazine, with polyfunctional acrylamides, and polyfunctional methacrylamides being more preferred. Ethylene-bis-acrylamide and methylene-bis-acrylamide are particularly preferred crosslinking monomers, with methylene-bis-acrylamide being especially preferred.

The ratio of amount of crosslinker monomer to the total amount of monofunctional monomers present in the terpolymer is from about 1 to about 10, more preferably from about 2 to about 6.

As used herein in reference to the monomeric components of the terpolymer, the terms "monomer" and "comonomer" shall be used interchangeably.

The polymerization of the monofunctional monomers and the crosslinking copolymer or copolymers of the present invention can be achieved through free radical initiation and propagation. In some preferred embodiments, one or more free radical initiators can be included in the in the reactant solution containing the monomers to facilitate polymerization. Any of a wide variety of initiators known in the art will find applicability in the present invention. In some preferred embodiments the initiator or initiators are water soluble. In other preferred embodiments, for example when wetting reactant solutions are used, sparingly water soluble initiators are preferred.

Those of skill in the art will readily be able to determine suitable initiators for a given reactant solution. Examples of suitable initiators include, for example, ammonium persulfate, potassium persulfate, azobis(4-cyanovaleric acid, Irgacure2959 (Ciba-Geigy, Hawthorn, N.Y.), 2,2'-azobis(2-amidino-propane)hydrochloride and the like. Preferably, the initiator or initiators are used in the range of from about 0.1% to about 1% by weight, based on the total reactant solution.

After the surface of the porous media or membrane is contacted with (i.e., is saturated with) the reactant solution, excess reactant solution removed from the external surfaces, while still leaving such external surfaces wetted with solution. For small sheets, excess reactant solution can be removed by, for example, placing the saturated sheet between two layers of plastic film and rolling out excess liquid with a rubber roll, such as for example, a hand brayer. In processing continuous sheets of porous media or membranes, removal of excess liquid can be performed with air knives, which direct a stream of air at the external surfaces. The force of the air stream sweeps away the excess reactant solution. One preferred technique is to run the sheet between two pressure controlled contacting rolls, at least one of which is elastomer coated, which rotate in the same direction as the sheet. The amount of liquid left in the sheet can be accurately controlled by adjusting the pressure of the contacting rolls.

After the excess reactant solution is removed, polymerization of the reactant solution is then begun by exposing the wet porous media or membrane to any conventional energy source, such as heating, ultraviolet light, electron beam or gamma radiation. Free radical polymerization initiated by heat is typically achieved by heating the saturated media or membrane to at least about 60° C. and maintaining that temperature for from about 0.1 to about 10 minutes, preferably between about 1 to about 2 minutes. Higher temperatures can be used depending on the combination of initiator and monomers used, up to the point where boiling or too rapid vaporization adversely affects the polymerization reaction.

In some preferred embodiments, ultraviolet light is used to initiate the in situ polymerization reaction. Preferably, the porous media or membrane saturated with the reactant solution (which optionally contains one or more initiators) is illuminated with an ultraviolet light source such as Fusion Systems F600 (Rockville, Md.) with an "H" bulb. Filters can be used to reduce or remove undesirable wavelengths which may cause unwanted damage to the porous media or membrane being modified. Those of skill in the art will appreciate that the balance of exposure time to the UV lights with lamp intensity to optimize polymerization conditions will be a matter of routine experimentation. Generally, with a 600 watt source, exposure times of from about 2 seconds to about 10 seconds, preferably from about 3 seconds to about 5 seconds, will be suitable.

In some preferred embodiments, electron beam technology is used to initiate polymerization, for example by methods described in U.S. Pat. No. 4,944,879, the disclosure of which is incorporated herein by reference. Typically, a web or individual sample is passed through a curtain of electrons generated by an electron beam processor. The processor delivers the desired dose at from about 100 kV to about 200 kV. The moving web or sample is transported at a speed suitable to give the desired exposure time under the curtain. Exposure time, combined with dose, determines the dose rate. Typical exposure times are from about 0.5 seconds to about 10 seconds. Dose rates generally are from 0.05 kGy (kiloGray) to about 5 kGy.

It is known that the presence of molecular oxygen adversely affects free radical polymerization reactions. Thus, in each of the foregoing methods of initiation previously described, it is preferred that the amount of oxygen in the reaction zone be controlled to levels below about 200 ppm, preferably below about 50 ppm. In some preferred embodiments, this is accomplished by flooding the reaction zone with inert gas such as nitrogen or argon, or by sandwiching the sheet between two layers of plastic film to exclude air.

In further preferred embodiments, the polymerization of the monomers of the reactant solution can be initiated by gamma irradiation. Typically, in this method, a wound roll of monomer saturated porous membrane is irradiated. The roll can be passed through the reactant solution and rolled up, or a previously wound up roll can be immersed in the reactant solution. Preferably, the reactant solution is degassed, that is, treated so as to remove air, and particularly oxygen, from the solution. In some preferred embodiments, degassing is accomplished by replacing air with an inert gas such as helium, nitrogen or argon. In other preferred embodiments, degassing is accomplished by reducing the pressure over the monomer solution, for example with a vacuum pump. The degassed monomer solution laden roll is then sealed with a sealing material so as to remain in a degassed state, and then irradiated at the desired dose. Preferably, the sealing material will not be degraded by the irradiation, and also does not significantly retard the gamma rays. A wide variety of materials are known in the art to be useful as sealing materials, for example many plastics, and borosilicate glass.

Typically, total dosages of about 0.02 to about 1.0 kGy are suitable. Typical exposures of about 5 to about 500 kilorads per hour, more preferably about 5 to about 150 kilorads per hour can be used, with typical irradiation times of from about 4 to about 60 hours. Those of skill in the art will readily be able to determine the proper balance of dose rate and time to arrive at the total dosage.

The degree to which the crosslinked terpolymer is grafted (i.e., the degree to which the terpolymer is bound) to the porous media or membrane can be controlled by, inter alia, the choice of method of initiation the polymerization reaction. For example, gamma irradiation gives a greater degree of grafting of the copolymer to a polymeric bulk matrix, while heat induced initiation will have a lesser degree of grafting. Those of skill in the art will readily be able to select the initiation method that will give the desired degree of grafting of terpolymer to the porous media or membrane.

The methods of the invention are applicable to the fabrication of sheet, tube and hollow fiber membranes. Coating methods are known from the textile fiber and monofilament industries which can be adapted to this process.

It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

Methods

1. Biomolecule Resistance

Biomolecule resistance to adsorption of porous membranes is measured by a static soak test using IgG protein. The protein solution is prepared with phosphate buffered saline (PBS), purchased from Sigma Chemical Company, St. Louis. Mo. (Sigma I-5523). Goat gamma globulin, also obtained from Sigma Chemical Company (Sigma I-5523) is used at a concentration of 1 mg/ml. $^{125}$I-goat anti(rabbit IgG) is purchased from NEN Life Science Products Boston, Mass. (NEX-155) and added to the protein solution to reach a final concentration of 0.1 /$\square$Ci/ml.

One 13 mm membrane disk is placed in a 16×100 mm test tube and exactly 1 ml of protein solution is added with a calibrated micropipettor. All test tubes are placed in a rack on a rotary shaker table and agitated for two hours. After agitation, the fluid is aspirated from the test tubes and the wet membrane is washed three times with 1 ml PBS. The washed membrane disk is transferred to a clean test tube and placed into a gamma counter (Minaxi Auto-gamma 5000 series from Packard Instrument Company, Downers Grove, Ill.) to determine the radioactivity bound on each disk, in units of counts per minute (cpm). Counts per minute for control tubes with 1 ml of protein solution and no membrane are also determined. Based on the control tubes, the relation between measured radioactivity and actual protein concentration is calculated for the amount of protein on each disk by the following equation:

Control relation=total mean *cpm/mg IgG*=total mean *cpm*/1000 /$\square$g IgG

Because the radioactivity found on each disk is measured, the amount of protein on each disk can be calculated through the following equation:

Protein bound in one 13 mm disk=(*cpm*/1.33 cm$^2$)*

(1000 /$\square$g IgG/total mean *cpm*)

This quantity is reported as protein bound in units of /$\square$g per cm$^2$ of frontal membrane area (a 13 mm disk has an area of 1.33 cm$^2$). At least duplicates are run for each sample tested.

Typical values found for low-binding commercial PVDF membranes, such as Durapor® membranes, are in the 15±4 / $\square$g/cm$^2$ range. In contrast, competitive PVDF membranes, such as Fluorodyne® membranes from Pall corporation, are in the 47±19 /$\square$g/cm$^2$ range.

2. Heat Stability of Biomolecule Resistance

To determine the heat stability of the biomolecule resistance of membranes, samples of membranes were either (1) heated to 135° C. for two hours in an oven; or (2) held in a 121° C. steam autoclave for one hour, and then tested as described above.

3. TOC (Total Organic Carbon) Method for Determining Extractables Level

Three 47 mm disks of membrane are cut and placed in a pre-cleaned 40 ml TOC vial. The vial is covered by GVX (hydrophobic PVDF) and is secured by a rubber band. The vial is then autoclaved at 126° C. for 1 hour. After cooling the vial is removed. The GVX is removed and 40.0 ml of fresh MilliQ® water is added, and the vial immediately capped with its pre-cleaned, Teflon lined septum cap. The membranes are allowed to extract overnight (minimum 16 hrs). The extracts are then analyzed for TOC levels by a Sievers 800 TOC analyzer. The raw PPM results are corrected for the blank, which is an empty vial that was also autoclaved and extracted overnight. These ppm TOC results are converted to /$\square$g C per cm$^2$ by multiplying by 40 ml and dividing by 52.05 cm$^2$.

4. TOC/NVR (Total Organic Carbon/Non-Volatile Residue) Method for Determining Extractables Level for Production Scale Membranes Approximately 8 ft$^2$ of membrane is coiled and then wrapped in GVX. The sample is then autoclaved at 126° C. for 1 hour. After cooling the membrane is removed from the GVX and added to 800 ml of fresh MilliQ® water in a pre-cleaned 1 L graduated cylinder such that the membrane is completely submerged. The cylinder is capped with a layer of aluminum foil and the membrane is allow to extract overnight (minimum 16 hours). The membrane is then removed. Aliquots of the extracts are then analyzed for TOC (40 ml) and NVR (200–600 ml) by standard methods. The results are corrected for blanks and reported as /$\square$g C per cm2 and mg NVR per 7.5 ft$^2$ respectively.

5. Flow Time Measurement to Determine Caustic Resistance

6. In this test modified membranes are tested for Flow Time, which is a method to measure permeability, exposed to 0.1 NaOH for two hours at ambient temperature and re-tested for Flow Time. The ratio of Flow Times after to before exposure is a measure of the effect of caustic on the membrane. A higher ratio shows more effect. A ratio of 1 shows no effect. A caustic resistant membrane is one that remains wettable after this exposure and has a ratio of flow times after exposure to that before exposure of less than about 1.5.

The following procedure is employed for this test:

1. Membranes are cut into 47 mm disks.
2. The disks are wetted out with water and placed in a filter holder with a reservoir for holding a volume of water and attached to a vacuum pump.
3. Water is flowed through the membrane under 27.5 inches Hg differential pressure.
4. After equilibrium was achieved, the time for 500 ml of water to flow through the membrane is recorded.

Generic Procedure for Modifying MAM Substrates

Reagent solutions are applied to the MAM membranes. The treated membranes are exposed to an energy source which may include thermal, UV, and electron beam energy suppliers. The reagent solution undergoes reaction on the MAM surface. The membranes are cleaned of unwanted solution and byproducts.

Because MAM surfaces are water wettable, aqueous solutions will directly wet the membranes and no prewetting procedures are needed.

The MAM surface is prepared as follows:

Six 47 mm disks of the hydrophobic PVDF membrane of 0.1 micron rating (Durapore® Millipore Corporation, Bedford, Mass.) were cut and their weight is recorded. They were then pre-wetted with water by being placed in methanol, and then soaked in MilliQ® water. A solution was made containing the acrylamide monomers, photoinitiator, and water. The composition of this solution to form a first coating is shown in Table 1:

TABLE 1

| Component | Grams |
|---|---|
| N,N-Dimethylacrylamide (DMAm) | 1.50 grams |
| Diacetoneacrylamide (DACAm) | 1.50 |
| N,N'-Methylenebisacrylamide(MBAm) | 0.75 |
| Irgacure 2979* photoinitiator | 0.15 |
| Water | 96.1 |
| | 100 total grams |

*Ciba-Geigy, Hawthorn, NY

After total dissolution of reactants, the solution is placed in a dish and the prewetted membranes are introduced into the solution. The dish is covered and the membranes are swirled on a Orbit shaker (LabLine Instruments, Melrose Park, Ill.) in the solution for 10 minutes. The membranes are removed and individually placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems UV exposure lab unit with an "H" bulb. Time of exposure is controlled by how fast the assembly moves through the UV unit. In this example, the assembly moves through the UV chamber at 20 feet per minute.

After emerging from the UV unit, the membranes are removed from the sandwich and immediately placed in methanol, where they are washed by swirling for 15 minutes. Next, they are washed in MilliQ® water for 15 minutes. Following this washing procedure they are allowed to air dry.

EXAMPLE 1

Positively Charged Surface

In this example, a PVDF membrane with a polyacrylamide (MAM) surface is further modified to give a positively charged d membrane. This is accomplished by polymerizing the monomer methacrylamidopropyltrimethylammonium chloride (MAPTAC) on the surface of the MAM membrane.

It should be noted that it is possible to modify PVDF membranes, which are hydrophobic, with MAPTC without the intermediate layer. To do so, however, requires the use of costly and difficult processing procedures that employ organic solvents. In addition, the membrane produced by these procedures is not heat stable.

In contrast, because the MAM/PVDF membranes are hydrophilic, an aqueous monomer solution containing MAPTC can be applied directly to the membrane and polymerized in situ to produce a heat stable positively charged surface. The stepwise method is given as follows:

1. A hydrophobic 0.65µ PVDF is modified by previously described procedures using DMAm, DACAm, and MBAm monomers to five a MAM/PVDF substrate as set forth below:
2. This hydrophilic membrane is further modified by:
   A. Directly treating with a solution of 15% MAPTC, 2% MBAm, 0.2% Irgacure 2959, in water for 10 minutes.
   B. Exposing the membrane to UV light (lab Fusion Unit at 10 feet/min).
   C. Washing and air drying.
3. The resulting membrane had a weight add-on of 2.86%. This amount can be increased by altering the recipe and exposure. The surface was instantly wettable.
4. The resulting membrane had very high positive charge as measured by the magenta density of the Ponceau S stained surface. The moist magenta density=1.50.

%. After 2 hours in an oven at 135° C., the membrane remained instantly wettable. After 4 hours in an oven at 135° C., the membrane wetted in 4 seconds. The magenta density remained essentially unchanged.

In contrast, the membrane made without the intermediate MAM layer becomes phobic, and not wettable when heated in the same manner as in step 5 above.

EXAMPLE 2

Negative Charged Surface

1. A hydrophobic 0.65µ PVDF is modified by previously described procedures using DMAm, DACAm, and MBAm monomers to give a MAM/PVDF substrate in accordance with U.S. Ser. No. 10/133,015, filed Apr. 26, 2002.
2. This hydrophilic membrane is further modified by treating with a solution of:
   12.0 grams 2-acrylamido-2-methylpropanesulfonic acid (AMPS)
   2.0 grams diacrylolpiperidine
   0.3 grams Irgacure 2959 photoinitiator
   85.7 grams water
3. After exposing the treated membrane to UV lights as in Example 1, washing, and drying, the membrane had a weight add-on of 2.8%.
4. To demonstrate that the membrane surface was highly negatively charged, the membrane was treated with a solution of methylene blue which is a positively charged dye.

After staining, the cyan optical density was recorded and was equal to 2.34. The starting MAM/DVX substrate gave a cyan density of 0.35.

5. The membrane was placed in an oven at 135C. for 2 hours. It wetted instantly with water.

EXAMPLE 3

Reactive Nucleophilic Affinity Functionality

The epoxide functionality is often employed in affinity chemistry to provide a reactive nucleophilic site. An epoxide ring will, for example, react with the amine group found on proteins and peptides. In this example, Epoxide functionality is made to extend outward from a MAM surface. The MAM surface provides a low nonspecific binding platform from which the epoxide ring extends and carries out its affinity reactions.

1. A hydrophobic 0.65μ PVDF is modified by previously described procedures using DMAm, DACAm, and MBAm monomers to give a MAM/PVDF substrate in accordance with U.S. Ser. No. 10/133,015, filed Apr. 26, 2002.

2. This hydrophilic membrane is further modified by treating with a solution of:
   5.0 grams glycidylmethacrylate (GMA)
   1.0 grams methylene bisacrylamide
   0.2 grams dimethoxyphenylacetophenone photoinitiator
   93.8 grams tertiary butylalcohol 3. After exposing the treated membrane to UV lights as in Example 1, washing, and drying, the membrane had a weight add-on of 0.4%.

4. The membrane made in step 3 above is placed in a jar with a solution of 2 grams of ethylenediamine in 15 grams of 0.2M sodium bicarbonate. A controlled membrane with the unmodified MAM surface is also placed in the jar. The jar is rolled at 50C. for 4 hours. The membranes are washed and stained with Ponceau S as in Example 1. The GMA modified membrane had a magenta density of 1.6 while the control membrane had a magenta density of 0.2.

5. The same experiment as in 4 above was performed after the membrane was heated in an oven for 2 hours at 135C. No decrease in magenta density was observed.

EXAMPLE 4

Reactive Electrophilic Affinity Functionality

1. A hydrophobic 0.65μ PVDF is modified by previously described procedures using DMAm, DACAm, and MBAm monomers to give a MAM/PVDF substrate in accordance with U.S. Ser. No. 10/133,015, filed Apr. 26, 2002.

2. This hydrophilic membrane is further modified by treating with a solution of:
   10.0 grams hydroxymethyldiacetoneacrylamide (HMDAA) 55% aqueous
   5.0 grams methylene bisacrylamide
   0.2 grams dimethoxyphenylacetophenone photoinitiator
   45 grams water 3. After exposing the treated membrane to UV lights as in Example 1, washing, and drying, the membrane had a weight add-on of 0.45%.

In aqueous media of pH 13–14, hydroxyl groups react with epoxide groups to form covalent bonds linking the hydroxyl oxygen with the methylene carbon atom of the epoxide. If the epoxide group is part of a molecule that has an easily detected moiety, the success of the reaction can be monitored.

4. Reaction of the pH MDAA surface was carried out by placing the membranes from Examples 1 and 2 above in a solution of glycidyltrimethylammonium chloride (GTMAC) in 0.2M ANaOH for 16 hours at room temperature. If reactive hydroxyl groups are present, the epoxide reacts and attaches a positively charged quarternary ammonium group.

5. The membranes were washed and placed into a solution of Ponceau S which is a negatively charged dye. The amount of positive charge present is recorded as the magenta optical density. The magenta density was 1.14.

6. The resulting membrane had a weight add-on of 2.86%. This amount can be increased by altering the recipe and exposure. The surface was instantly wettable.

7. The resulting membrane had a very high positive charge as measured by the magenta density of the Ponceau S stained surface. The moist magenta density=1.50.

8. After 2 hours in an oven at 135° C., the membrane remained instantly wettable. After 4 hours in an oven at 135° C., the membrane wetted in 4 seconds. The magenta density remained essentially unchanged.

EXAMPLE 5

Superphobic Surface

In this example, a PVDF membrane with a polyacrylamide (MAM) surface is further modified to give a superphobic surface. Superphobic in this context means not wettable by hexane, which has a surface tension of 18.4 dynes/cm at 20° C. This is accomplished by polymerizing the fluoroalkyl monomer 2-(N-ethylperfluorooctanesulfonamido)ethyl acrylate on the surface of the MAM membrane.

1. A hydrophobic 0.65μ PVDF is modified by previously described procedures using DMAm, DACAm, and MBAm monomers to give a MAM/PVDF substrate as set forth in example 1.
2. This hydrophilic membrane is further modified by treating the membrane: with a solution of 7% 2-(N-ethylperfluorooctanesulfonamido)ethyl acrylate, 1% hexanedioldiacrylate, 0.2% dimethoxyphenylacetophenone, and 91.8% hexamethyldisiloxane.
3. Exposing the membrane to UV light (lab Fusion unit at 10 feet/min).
4. Washing with isopropylalcohol and air drying.
5. The resulting membrane had a 6.5% weight add-on.
6. The resulting membrane did not wet when placed in hexane.

What is claimed is:

1. A porous membrane comprising a polymeric microporous substrate membrane and a separately formed heat stable, biomolecule resistant surface having a biomolecule binding of less than about 30 micrograms per square centimeter as measured by the lgG binding test and a heat resistance of less than about twice the lgG adsorption of the same surface prior to heat exposure as measured by exposing the membrane to a method selected from the group consisting of heating to 135° C. for two hours in an oven and heating to 121° C. in a steam autoclave for one hour wherein said surface is comprised of a first polymeric coating and a second polymeric coating, the first coating being a crosslinked hydrophilic terpolymer and a second coating applied to the first coating, the second coating being a second polymer modified with functional groups and wherein the sizes of the pores of the porous membrane after applying the first and second coatings are not significantly different from the sizes of pores of the microporous substrate membrane before application of the first and second coatings.

2. The membrane of claim 1 having a biomolecule binding of less than about 20 micrograms per square centimeter as measured by the lgG binding test.

3. The membrane of any one of claims 1 or 2 wherein said microporous membrane being formed from one or more of the group consisting of an aromatic sulfone polymer, polytetrafluoroethylene, a perfluorinated thermoplastic polymer, a polyolefin polymer, ultrahigh molecular weight polyethylene, and polyvinylidene difluoride.

4. The membrane of any one of claims 1 or 2 wherein said substrate membrane is a microporous polyvinylidene difluoride membrane.

5. A clean, caustic resistant, porous membrane comprising a polymeric microporous substrate membrane and a heat stable biomolecule resistant surface, wherein said heat stable biomolecule resistant surface is a separately formed surface coating which comprises:
    a first coating comprising a first crosslinked terpolymer, said terpolymer comprising at least two monofunctional monomers selected from the group consisting of acrylamides, methacrylamides, and N-vinyl pyrrolidones, and at least one polyfunctional monomer selected from the group consisting of polyfunctional acrylamides, polyfunctional methacrylamides, and diacroylpiperazines and a second coating comprising a second crosslinked terpolymer, or copolymer modified with functional groups selected from the group consisting of hydrophilic functional groups and hydrophobic functional groups and wherein the sizes of the cores of the porous membrane after applying the first and second coatings are not significantly different from the sizes of pores of the microporous substrate membrane before application of the first and second coatings.

6. The membrane of claim 5 wherein said microporous substrate membrane is formed from one or more of the group consisting of an aromatic sulfone polymer, polytetrafluoroethylene, a perfluorinated thermoplastic polymer, a polyolefin polymer, ultrahigh molecular weight polyethylene, and polyvinylidene difluoride.

7. The membrane of claim 5 wherein said first crosslinked terpolymer of said first coating comprises at least one monofunctional monomer that is an acrylamide, wherein the acrylamide nitrogen of said acrylamide is substituted with at least one gem dialkyl substituted carbon.

8. The membrane of claim 6 wherein said first crosslinked terpolymer of said first coating comprises at least one monofunctional monomer that is an acrylamide, wherein the acrylamide nitrogen of said acrylamide is substituted with at least one gem dialkyl substituted carbon.

9. The membrane of claim 5 wherein said first crosslinked terpolymer of said first coating is a copolymer formed from dimethylacrylamide, diacetone acrylamide, and methylene-bis-acrylamide.

10. The membrane of claim 5 wherein said first crosslinked terpolymer of said first coating is a copolymer formed from dimethylacrylamide, diacetone acrylamide, and methylene-bis-acrylamide.

11. The membrane of claim 5 wherein said first crosslinked terpolymer of said first coating is a copolymer formed from methylene-bis-acrylamide, N-vinyl pyrrolidone, and either of dimethylacrylamide or diacetone acrylamide.

12. The membrane of claim 6 wherein said first crosslinked terpolymer of said first coating is a copolymer formed from methylene-bis-acrylamide, N-vinyl pyrrolidone, and either of dimethylacrylamide or diacetone acrylamide.

13. The membrane of claim 5 wherein said second crosslinked terpolymer or copolymer is modified with fluoroalkyl groups.

14. A clean, caustic resistant, porous membrane comprising a polyvinylidene difluoride microporous substrate membrane and a heat stable biomolecule resistant surface formed of two polymer coatings, wherein said first coating is a separately formed surface coating which comprises a first crosslinked terpolymer, said crosslinked terpolymer of said first coating being a copolymer formed from either:
    (a) methylene-bis-acrylamide, dimethylacrylamide, and diacetone acrylamide; or
    (b) methylene-bis-acrylamide, N-vinyl pyrrolidone, and either of dimethylacrylamide or diacetone acrylamide,
    and a second coating comprising a second crosslinked terpolymer or copolymer modified with functional groups selected from the group consisting of hydrophilic functional groups and hydrophobic groups,
    and wherein the sizes of the pores of the porous membrane after applying the first and second coatings are not significantly different from the sizes of cores of the microporous substrate membrane before application of the first and second coatings.

15. The membrane of claim 14 wherein said crosslinked terpolymer of said first coating is a copolymer formed from methylene-bis-acrylamide, dimethylacrylamide, and diacetone acrylamide.

16. The membrane of claim 14 wherein said crosslinked terpolymer of said first coating is a copolymer formed from methylene-bis-acrylamide, N-vinyl pyrrolidone, and either of dimethylacrylamide or diacetone acrylamide.

17. The membrane of claim 14 wherein said first coating is a separately formed surface coating; said surface coating comprising a crosslinked terpolymer; said crosslinked terpolymer comprising:
    at least one polyfunctional monomer selected from the group consisting of polyfunctional acrylamide monomers, polyfunctional methacrylamide monomers, and diacroylpiperazines; and at least two different monofunctional monomers selected from the group of N-vinyl pyrrolidone monomers and monomers having the formula:

$H_2C=C(R^1)C(=O)N(R^2)(R^3)$ wherein:
    $R^1$ is —H or $CH_3$,
    $R^2$ is H or $C_1$–$C_6$, preferably $C_1$–$C_3$ alkyl, either linear or branched,
    $R^3$ is H or $C_1$–$C_6$, preferably $C_1$–$C_3$ alkyl, either linear or branched, or $C(CH_3)_2CH_2C(=O)CH_3$, or (P=O)((NCH_3)_2)_2$, or $C=ON(CH_3)_2$, or $CH_2$—O—$R^4$, where $R^4$ is $C_1$–$C_5$ alkyl, either linear or branched, or $(CH_2$—$CH_2$—O)n-$R^5$, where $R^5$ is —H or $OH^3$, and n=2 or 3; provided that $R^2$ and $R^3$ are not simultaneously H.

18. The membrane of claim 14 wherein said second crosslinked terpolymer or copolymer is modified with fluoroalkyl groups.

19. The membrane of any one of claims 5, 6, 7, 8, 9, 10, 11, 12, 14, 15, 16 or 17 wherein said hydrophilic functional group is a quaternary ammonium salt.

20. A clean, caustic resistant, porous membrane comprising a microporous membrane substrate and a heat stable biomolecule resistant surface, wherein said heat stable biomolecule resistant surface is formed of two separately formed polymeric coatings which comprise:

a first coating comprising a first crosslinked terpolymer, said terpolymer comprising at least two monofunctional monomers selected from the group consisting of acrylamides, methacrylamides, and N-vinyl pyrrolidones, and at least one polyfunctional monomer selected from the group consisting of polyfunctional acrylamides, polyfunctional methacrylamides, and diacroylpiperazines and a second coating comprising a second crosslinked terpolymer, or copolymer modified with functional groups selected from the group consisting of hydrophilic functional groups and hydrophobic functional groups, wherein said second coating is a polymer formed from a monomer selected from the group consisting of (3-(methacryloylamino) propyl) trimethylammonium chloride, (3-acrylamidopropyl)trimethylammonium chloride, 2-acrylamido-2-methyl-1-propanesulfonic acid and aminopropylmethacrylamide.

* * * * *